(12) United States Patent
Blasiak et al.

(10) Patent No.: US 6,785,734 B1
(45) Date of Patent: Aug. 31, 2004

(54) SYSTEM AND METHOD FOR PROCESSING CONTROL INFORMATION FROM A GENERAL THROUGH A DATA PROCESSOR WHEN A CONTROL PROCESSOR OF A NETWORK PROCESSOR BEING CONGESTED

(75) Inventors: Richard John Blasiak, Chapel Hill, NC (US); David Wayne Cosby, Raleigh, NC (US); Anthony Matteo Gallo, Apex, NC (US); Sonia Kiang Rovner, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/546,132

(22) Filed: Apr. 10, 2000

(51) Int. Cl.7 .................... G06F 15/173; G06F 15/177; H04L 12/28
(52) U.S. Cl. ...................... 709/238; 709/221; 709/239; 370/392
(58) Field of Search ............................... 709/221, 250, 709/238; 714/6, 11; 370/353, 389, 392, 395.4, 395.6, 398, 233, 431; 710/14, 305

(56) References Cited

U.S. PATENT DOCUMENTS

| | | | |
|---|---|---|---|
| 3,970,798 A | | 7/1976 | Epenoy et al. |
| 4,539,635 A | | 9/1985 | Boddie et al. |
| 4,598,358 A | | 7/1986 | Boddie et al. |
| 4,752,924 A | * | 6/1988 | Darnell et al. ............... 370/431 |
| 4,998,069 A | | 3/1991 | Nguyen et al. |
| 5,008,878 A | * | 4/1991 | Ahmadi et al. ............. 370/353 |
| 5,247,657 A | | 9/1993 | Myers |
| 5,359,592 A | * | 10/1994 | Corbalis et al. ............ 370/233 |
| 5,483,642 A | | 1/1996 | Okazawa et al. |
| 5,724,348 A | * | 3/1998 | Basso et al. ................. 370/398 |
| 5,729,761 A | * | 3/1998 | Murata et al. ................ 710/14 |
| 5,909,550 A | * | 6/1999 | Shankar et al. ............. 709/227 |
| 5,982,783 A | * | 11/1999 | Frey et al. ............... 370/395.6 |
| 6,091,729 A | * | 7/2000 | Dove ....................... 370/395.4 |
| 6,147,993 A | * | 11/2000 | Kloth et al. ................. 370/392 |
| 6,157,644 A | * | 12/2000 | Bernstein et al. ........... 370/392 |
| 6,219,699 B1 | * | 4/2001 | McCloghrie et al. ....... 709/221 |
| 6,222,380 B1 | * | 4/2001 | Gerowitz et al. ............. 326/38 |
| 6,370,605 B1 | * | 4/2002 | Chong, Jr. ..................... 714/6 |
| 6,452,920 B1 | * | 9/2002 | Comstock ................... 370/389 |
| 6,460,120 B1 | * | 10/2002 | Bass et al. .................. 709/250 |
| 6,484,224 B1 | * | 11/2002 | Robins et al. .............. 710/305 |
| 6,611,522 B1 | * | 8/2003 | Zheng et al. ............... 709/238 |

\* cited by examiner

*Primary Examiner*—Rupal Dharia
*Assistant Examiner*—Quang Q Nguyen
(74) *Attorney, Agent, or Firm*—Bracewell & Patterson; Joscelyn G. Cockburn

(57) ABSTRACT

A method, system, program product, and data structure for processing network communication within a communication network from a general processor to a network processor. An informational frame is encapsulated into a packet for transmission within a communication network from a general processor to a network processor having a data processor and a control processor. If the informational frame is a control frame and the control processor is congested and if the control frame only needs message routing services from the locally connected network processor, the encapsulated packet is designated as a data-type packet so that the data processor processes the control frame. The encapsulated packet is then sent from the general processor to the network processor. The data processor decapsulates the encapsulated packet, parses the control frame and processes the control frame. The data processor directs and executes a control command defined within the control frame to a target control processor of a target network processor designated within the encapsulated packet.

30 Claims, 5 Drawing Sheets

SYSTEM AND METHOD FOR PROCESSING CONTROL INFORMATION FROM A GENERAL THROUGH A DATA PROCESSOR WHEN A CONTROL PROCESSOR OF A NETWORK PROCESSOR BEING CONGESTED

CROSS-REFERENCE TO RELATED APPLICATION

The present application cross-references the related U.S. patent application Ser. No. 09/479,751 filed on Jan. 7, 2000 entitled "NETWORK PROCESSOR TRANSPORT PROTOCOL" assigned to International Business Machines of Armonk, New York, and this application is incorporated by reference herein.

BACKGROUND OF THE INVENTION

1. Technical Field

The present invention relates in general to a method and system for managing communication networks and in particular to a method and system within a packet-based, linked-layer network communication system for efficiently interfacing a general processor, such as a local or remote general purpose central processing unit (CPU), to a network processor. More particularly, the present invention relates to an improved encapsulation transport protocol for exchanging control and data flows between general purpose data processing devices and network processors.

2. Description of the Related Art

Communication networks have grown both geographically and in complexity. This growth has resulted in the need for greater scalability in the design of a network infrastructure. The continual need to provide an improved distributed control infrastructure for a network exists. An improved distributed control infrastructure for a network is particularly needed for maximizing the efficient utilization of network resources.

Within frame-based or packet-based networks, such as Ethernet, Packet-Over-SONET (POS), Token Ring networks, etc., transport protocols are utilized to define communication between control infrastructure nodes such as bridges, routers, and switches. In this context, a "protocol" is defined as a set of rules and conventions utilized by the applications participating in a network communication session. The set of rules can be very complex, and layered protocol models have been adopted to help simplify and manage network protocol definitions. The International Standards Organization (ISO) responded to this need by developing the Open Systems Interconnection (OSI) model for inter-computer communications. Prior to the development of OSI, International Business Machines (IBM) introduced a System Network Architecture (SNA) for general purpose computer networks. Both OSI and SNA models consist of at least seven layers with well-defined interfaces between layers.

Fundamental to such data transport models is the notion of protocol layering. The utility of layered protocols such as SNA and OSI is in the uniform structure provided therein in which layers interact in a peer-to-peer manner, and the function of each individual layer is performed without interfering with the interface between the function of the individual layer and the layers immediately above and below it. The OSI model includes the following seven layers: Application (7), Presentation (6), Session (5), Transport (4), Network (3), Datalink (2), and Physical (1). The higher layers (4)–(7) operate on messages. The network layer (3) typically operates on packets, the datalink layer (2) on frames, while the lowest level, physical layer (1), operates on data bits.

Current communication networks often employ network processors, which perform specialized functions directed towards the coordination of communication sessions. Network processors utilized in switching systems for layers 2, 3, 4, and higher are designed to forward frames based on control information received from a general processor, such as a general purpose central processing unit (CPU). Within this context, the general processor (i.e., general purpose CPU) maintains network topology information for various networking protocols which are modeled in the link-layer manner described above (such as Transparent Bridging, OSPF, RIP, BGP, etc.). The general processor may also be utilized to provide state information to network management applications.

In a communication network, a control point, which contains general processor (i.e., the general purpose CPU), communicates with the Internet, a local area network (LAN), a wide area network (WAN), or a server to process or forward messages, such as control information or commands or data messages, through a switch, router, or bridge. The switch, router, or bridge typically contains at least various network processors coupled to a switch fabric for processing, forwarding, and routing the messages to desired destinations. The general processor in the control point is coupled in communication with the various network processors. Normally, one of the network processors, such as the first processor, acts as the message router for routing messages from the general processor to the switch fabric, which, in turn, unicasts, broadcasts, or multi-casts the messages to the other network processors.

Each network processor has one or more control processor, such as a guided Frame handler (GFH) or a guided tree handler (GTH), and one or more data processor, such as a general data handler (GDH). Control information, such as control commands, are directed (from the general processor) to and processed by a control processor within the network processor while data messages are directed (from the general processor) to and processed by a data processor within the network processor. Encapsulation of messages has been employed to increase the efficiency of processing messages in a network by categorizing and designating the message types between control information and data messages and by directing the control information to the control processor and the data messages to the data processor.

A message is encapsulated into a packet by the general processor, and, depending upon the type of message (i.e., control information or data message), the information type for the encapsulated packet is respectively designated by the general processor as a control-type packet or a data-type packet. If the encapsulated packet is a control-type packet, then the general processor sends the encapsulated packet to the control processor of the network processor. On the other hand, if the encapsulated packet is a data-type packet, then the general processor sends the encapsulated packet to the data processor of the network processor. U.S. patent application Ser. No. 09/479,751 discloses an exemplary system and method for processing messages from a general processor to a network processor by encapsulating control information into control-type packets and data messages into data-type packets and respectively forwarding the control-type packets to the control processor and the data-type packets to the data processor.

As mentioned earlier, only one network processor acts as the message router for routing messages from the general processor to the switch fabric and the other network processors. The network processor which acts as the single message router therefore may become a point of contention in forwarding and processing messages. The control processors within this network processor are usually special-purpose control processors that perform specialized operations and have relatively limited capability and processing bandwidth. Due to the limitations of the control processor, a congestion of control information from the general processor to be processed by the control processor within the network processor may easily result. The congestion results in a decrease by the network processor to efficiently process control information.

In contrast, the data processors are normally general-purpose processors having relatively large capability and processing bandwidth. Because there are often more data processors than control processors within network processors, data processors are less constrained in resources than control processors. The present invention recognizes the need to relieve the congestion of control information to be processed by control processors within network processors. In accordance with the present invention, such congestion is alleviated by utilizing available resources of data processors within network processors.

SUMMARY OF THE INVENTION

A method, system, program product, and data structure for processing network communication within a communication network from a general processor to a network processor. An informational frame is encapsulated into a packet for transmission within a communication network from a general processor to a network processor having a data processor and a control processor. If the informational frame is a control frame and the control processor is congested and if the control frame only needs message routing services from the locally connected network processor, the encapsulated packet is designated as a data-type packet so that the data processor processes the control frame. The encapsulated packet is then sent from the general processor to the network processor. The data processor decapusulates the encapsulated packet, parses the control frame and processes the control frame. The data processor directs and executes a control command defined within the control frame to a target control processor of a target network processor designated within the encapsulated packet.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF AN PREFERRED EMBODIMENT

Figure 1:
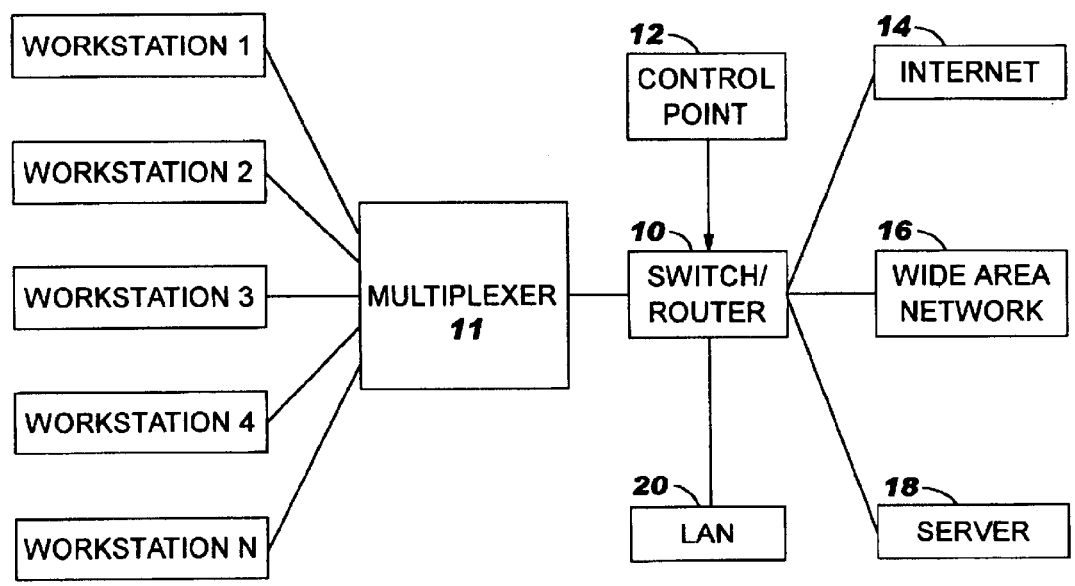
FIG. 1 is a high-level block diagram illustrating an exemplary communication network in which the present invention is used.

With reference now to the figures and in particular to FIG. 1, a high-level block diagram illustrating an exemplary communication network in which the present invention is used and implemented is shown. The communication network has a switch/router 10 connected through a simple multiplexing device (multiplexer) 11 to workstations 1, 2, 3, 4 . . . N (i.e., which is a local area network (LAN)). Switch/router 10 is also connected to a control point 12, Internet 14 or a wide area network (WAN) 16, a server 18, and another local area network (LAN) 20. LAN 20 may be an Ethernet-type network, a token-ring type network, or any other local area network which may include various additional workstations. The present invention is not in any way limited to being used and implemented in the specific network configuration of FIG. 1, and the present invention may be used and implemented in any suitable one of a variety of different network configurations. For example, some elements or sub-systems may be added while other elements or sub-systems may be deleted from the network configuration.

Multiplexer 11 is a conventional device that selects one of the workstations (i.e., workstation 1, 2, 3, 4, or . . . N) and allows the selected workstation to communicate with switch/router 10. The use and operation of multiplexers to provide such services are well known in the art. Control point 12 may be a data processing system (such as a data processing system for a network administrator) that interfaces with switch/router 10. For example, the data processing system may have a system bus to which a general processor (i.e., a general-purpose central processing unit (CPU)), a memory system, and input/output (I/O) devices are coupled. The I/O devices may include a keyboard, a pointing device (mouse), and a display device. The CPU is operated with a conventional multi-tasking operating system, software drivers, and application programs that configure the data processing system.

Figure 2:
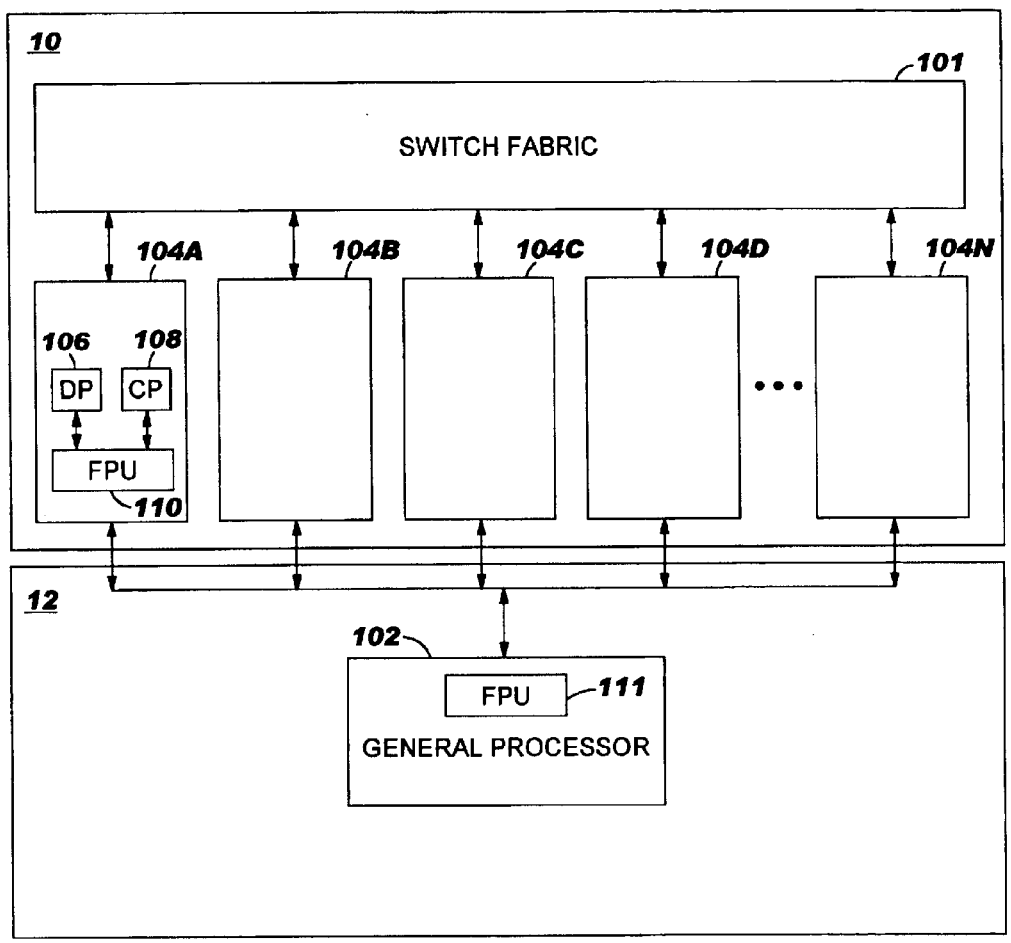
FIG. 2 is a block diagram illustrating in more detail the communication between the control point and the switch/router within the communication network shown in FIG. 1.

Referring now to FIG. 2, a block diagram illustrating in more detail the communication between control point 12 and switch/router 10, which may be considered, for example, an Ethernet transport system, within the communication network is shown in FIG. 1. Control point 12 comprises a general processor 102. Switch/router 10 has various network processors 104A, 104B, 104C, 104D . . . 104N coupled to a switch fabric 101 for processing, forwarding, and routing information and messages to desired or appropriate destinations. General processor 102 is coupled to network processors 104A, 104B, 104C, 104D . . . 104N. Network processor 104A acts as the message router for routing messages from general processor 102 to switch fabric 101, which, in turn, unicasts, broadcasts (to all network processors), or multi-casts (to selected network processors) the messages to other network processors 104B, 104C, 104D . . . 104N. Each network processor includes various network infrastructure components such as one or more control processors 108 (e.g., a guided frame handler (GFH) or a guided tree handler (GTH)) and one or more data processors 106 (e.g., a general data handler (GDH)). Control processor 108 and data processor 106 are coupled to a frame processing unit (FPU) 110. FPU 110 within network processor 104A transmits and receives packets respectively to and from general processor 102. A similar FPU 111 located within general processor 102 serves to transmit and receive packets to and from network processor 104A. Both frame processing units 110 and 111 include programmed logic for encapsulating and decapsulating frames as will be described in further detail with reference to FIGS. 3, 4, and 5.

As discussed earlier and as disclosed in U.S. patent application Ser. No. 09/479,751, a message is encapsulated into a packet by general processor 102, and, depending upon the type of message (i.e., control information or data message), the information type for the encapsulated packet is designated by general processor 102 as a control-type packet or a data-type packet. If the encapsulated packet is a control-type packet, then general processor 102 sends the encapsulated packet to control processor 108 of the network processor. On the other hand, if the encapsulated packet is a data-type packet, then general processor 102 sends the encapsulated packet to data processor 106 of the network processor. U.S. patent application Ser. No. 09/479,751 further discloses setting the informational type field for an encapsulated packet with a "D1" or "D2" designation for a data-type packet and with a "CT" designation for a control-type packet. A "D1" designation signifies that the informational frame of the encapsulated packet contains data only, while a "D2" designation signifies that the informational frame of the encapsulated packet contains data and additional routing information.

In the present exemplary embodiment, network processor 104A (i.e., NP1) acts as the message router for routing messages from general processor 102 to switch fabric 101 and to other network processors 104B, 104C, 104D . . . 104N. The present invention, however, is not limited in any way to just network processor 104A acting as the message router and other network processors may also operate as message routers. Network processor 104A, which acts as the message router in the present exemplary embodiment, therefore may receive a substantially large number of requests in forwarding and processing messages. At least one control processor 108 within network processor 104A is a special-purpose control processor that performs specialized operations and has relatively limited capability and processing bandwidth. Due to the limitations of the control processor(s) 108, a congestion or overload of control information from general processor 102 to be processed by the one or more control processor 108 within network processor 102 may easily result. The congestion results in a decreased ability of switch/router 10 to efficiently process control information from control point 12.

Data processor 106, on the other hand, is normally a general-purpose processor having relatively large capability and processing bandwidth. One or more data processors 106 usually exist in each of network processors 104A, 104B, 104C, 104D . . . 104N. The data processor(s) 106 is less constrained in resources than the control processor(s) 108.

The present invention encapsulates at least some informational frames, that are of the control-frame type and that contain control information, into data-type packets. The encapsulated data-type packets are directed to and processed by data processor 106, which is the more-available and less-constrained processor, instead of directed to control processor 108. The encapsulation of informational frames into data-type packets is, particularly, useful when congestion of control processor 108 occurs. The present invention thus relieves the congestion of control information to be processed by control processor 108 and further enables better utilization of the more available resources of data processor 106.

Figure 3:
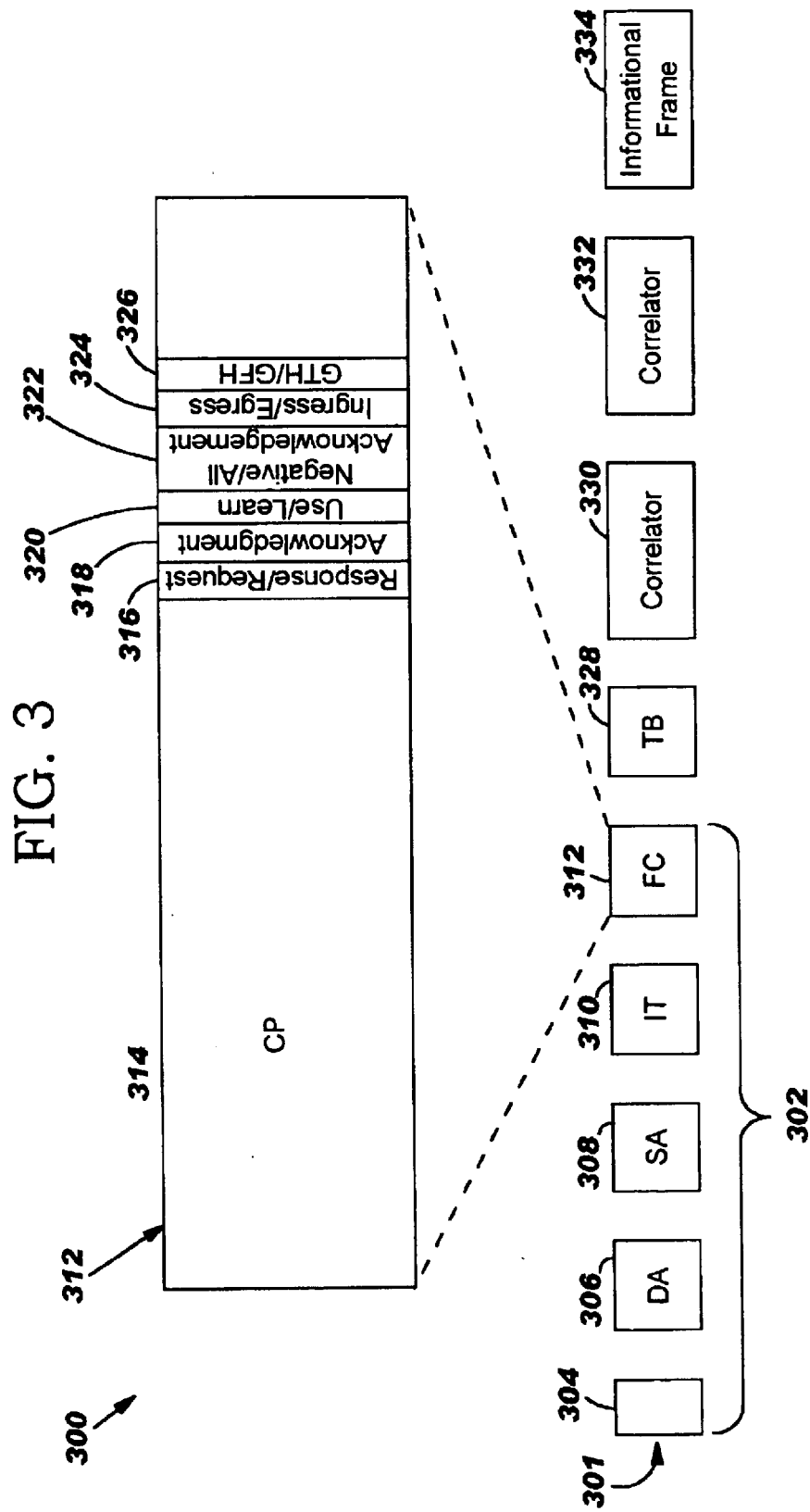
FIG. 3 illustrates an exemplary encapsulated packet of an informational frame in accordance with the present invention.

With reference now to FIG. 3, an exemplary encapsulated packet 300 of an informational frame 334 in accordance with the present invention is shown. Encapsulated packet 300 is a data structure that is typically stored in storage elements of processors. After being designated as a data-type packet within FPU 111 of general processor 102, encapsulated packet 300 is delivered to network processor 104A which reads the designation (in informational type field 310 and in control-point type field 314, as necessary) of encapsulated packet 300 and processes encapsulated packet 300 in accordance with the defined designations set by the present invention. Flexible and reliable communication between general processor 102 and network processor 104A as well as with switch fabric 101 and other network processors 104B, 104C, 104D . . . 104N is then established.

Encapsulated packet 300 provides a model within link layer 301 in which several encapsulated fields are provided. A Media Access Control (MAC) header 302 typically includes a preamble field 304 utilized for informational flow synchronization. A destination address (DA) 306 provides the MAC address of the destination station at which encapsulated packet 300 is to be ultimately processed. Similarly, a source address (SA) 308 provides the MAC address of the sending station which generated encapsulated packet 300. MAC header 302 also includes an informational type field 310, which specifies the type of information in informational frame 334. Encapsulated packet 300 also includes a frame control field 312, a target blade field 328, correlator fields 330 and 332, and informational frame 334.

Frame control field 312 contains various fields that are set to appropriate values for proper processing of encapsulated packet 300 by network processor 104A. Exemplary frame control field 312 is shown in more detail in FIG. 3 and comprises a control-point type field 314, response/request indicator field 316, acknowledgment field 318, use/learn field 320, negative/all acknowledge field 322, an ingress/egress field 324, a General Tree Handler/Guided Frame Handler ("GTH/GFH") field 326, and other such frame control fields. Control-point type field 314 will be discussed later in conjunction with informational type field 310. Response/request indicator field 316 is set to designate encapsulated packet 300 as either a response guided frame or an unprocessed request (e.g., field=0 for request and 1 for response). Acknowledge field 318 controls whether or not the guided frame handler in network processor 104A is to acknowledge encapsulated packet 300 as a guided frame (e.g., field=0 for no acknowledgment and 1 for acknowledgment). Use/learn bit 320 indicates whether information from the sending station at source address 308 is to be either used or learned by network processor 104A (e.g., field=0 to learn and 1 to use). Negative/all acknowledge field 322 is ignored by network processor 104A if field 322 is set equal to zero (0) since, in this case, all guided frames are acknowledged by network processor 104A. Otherwise, if field 322 is set equal to one (1), then only guided frames that do not complete successfully are acknowledged by network processor 104A. Ingress/egress field 324 controls whether encapsulated packet 300 is processed on the ingress side of network processor 104A or the egress side of network processor 104A (e.g., field=0 for egress processing and 1 for ingress processing). GTH/GFH field 326 is set to specify whether the GTH or GFH within network processor 104A is to handle encapsulated packet 300 (e.g., field=0 for handling by GFH thread and 1 for handling by GTH thread).

Target blade field 328 stores the information that designates the target blade or target network processor(s) 104B, 104C, 104D ... 104N to which network processor 104A routes and/or processes encapsulated packet 300. Correlator fields 330 and 332 contain information (such as an identifying component and index) for correlating encapsulated packet 300 to a request made by control point 12. Informational frame 334 contains either data only, data with additional routing information, or control information, that is to be routed and/or processed by network processor 104A for the ultimate destination station at the destination address specified in DA field 306. Informational frame 334 also has a Frame Check Sequence (FCS) or checksum for transmission error detection.

The control and routing information in informational frame 334 includes control commands that are used to control and perform operations on various network processors 104A, 104B, 104C, 104D ... 104N. Exemplary control commands that may be in informational frame 334 are listed as follows:

End_Delimiter—Marks the end of a guided frame sequence.
Build_TSE_Free_List—Builds a tree list.
Software_Action—Executes software action.
Unsolicited—Identifies frames initiated by an embedded processor complex (EPC) picocode.
Block_Write_Raw—Writes a block of data to consecutive addresses.
Duplicate_Write_Raw—Writes duplicate data to registers or memory.
Read_Raw—Requests and responds when reading register or memory data.
Write_Bits—Writes specified bits in a 32-bit word on an internal bus of an EPC.
Insert_Leaf—Inserts a leaf into the search tree.
Update_Leaf—Updates a leaf of the search tree.
Read_Leaf—Requests and responds when reading leaf page data.
Delete_Leaf—Deletes a leaf of the search tree.
Define_Tree—Defines an entry in the look up definition table.
Purge_Tree—Releases resources associated with a tree.
Swap_Tree_Entries—Swaps two entries in the look up definition table.
Read_TSM_Data—Reads data from the Tree Search Memory (TSM) as a byte-stream or an element.
Write_TSM_Data—Writes data to the TSM as a byte-stream or an element.
Register_Roping_User—Registers a user with the roping service.
Deregister_Roping_User—De-registers a user from the roping service.
Zap_Leaves—Deletes leaves of a tree that have the "delete pending" bit set to True.
View_Leaves—Reads the entire contents, or a portion thereof, of a specified number of leaves in a tree.
Read_And_Branch—Reads the entire contents, or a portion thereof, of a specified number of leaves in a tree and also branches to a user-specified procedure.
Warm_Boot—Executes a boot sequence without recycling the power.
Read_Exception_Counters—Reads the contents of one or more exception counters.
Clear_Exception_Counters—Resets the value of one or more exception counters to zero.
Enable_CLPs—Enables one or more Classifier Lookup processor (CLPs).
Disable_CLPs—Disables one or more CLPs.
Debug—Puts a CLP into a single-step mode.
Undebug—Takes a CLP out of the single-step mode.
Status—Indicates the CLPs that are currently enabled/disabled as well as those that are in single-step mode.
Step—Causes a CLP to execute the next pico-code instruction.
Breakpoint—Sets, reads, or resets a breakpoint.
Go—Causes the specified CLP to execute instructions starting from the location pointed to by the program counter until a "halt" or "exit" instruction is executed.
Trace—Traces the execution path of a CLP.

Some of the control commands are preferably processed by control processor 108. In this instance and/or in the situation in which control processor 108 is not congested, the encapsulation logic is set up to encapsulate informational frame 334 into a control-type encapsulated packet 300 so that the control-type packet is directed to and processed by control processor 108.

The encapsulated designation is determined in accordance with an assessment performed on informational frame 334 in which the payload of informational frame 334 contains end-to-end user data or control/topology information or routing messages. If the payload is simply data, then informational type field 310 is set to a "D1" designation by general processor 102 in order to designate encapsulated packet 300 as a data-type packet. In this instance, control-point type field 314 is automatically set with a data-type setting (i.e., value equal to "0D" to signify that informational frame 334 contains data). Network processor 104A accordingly receives from general processor 102 and processes encapsulated packet 300 within data processor 106 as a data-type packet. If the payload is data with additional routing information, then informational type field 310 is set to a "D2" designation by general processor 102 in order to designate encapsulated packet 300 as a data-type packet. Since the payload includes data, then control-point type field 314 is automatically set with a data-type setting (i.e., value equal to "0D" to signify that informational frame 334 contains data). In this situation, network processor 104A also receives from general processor 102 and processes encapsulated packet 300 within data processor 106 as a data-type packet.

If the payload in informational frame 334 is control information or routing messages, then informational type field 310 is set to a "CT" designation by general processor 102 to designate encapsulated packet 300 as a control-type packet. In this instance, control-point type field 314 is automatically set with a control-type setting (i.e., value equal to "0C" to signify that informational frame 334 contains control information). Network processor 104A accordingly receives from general processor 102 and processes encapsulated packet 300 within control processor 108 as a control-type packet. However, general processor 102 may determine, through conventional inter-processor communication which is able to verify, for example, the tasks scheduled by the operating system task scheduler of network processor 104A, that control processor 108 is congested or overloaded with scheduled tasks for processing various frames. In this case, general processor 102 instead sets informational type field 310 for encapsulated packet 300 with a "D2" designation for designating encapsulated packet 300 with control information or routing messages as a data-type packet. Control-point type field 314 is set with a control-type setting (i.e., value equal to "0C") to signify to data processor 106 within network processor 104A that informational frame 334 contains control information and is to be processed accordingly. Based on the "D2" designation of encapsulated packet 300 and the control-type setting in control-point type field 314, network processor 104A accordingly receives from general processor 102 and processes encapsulated packet 300 within data processor 106 as a control-type packet.

Figure 4:
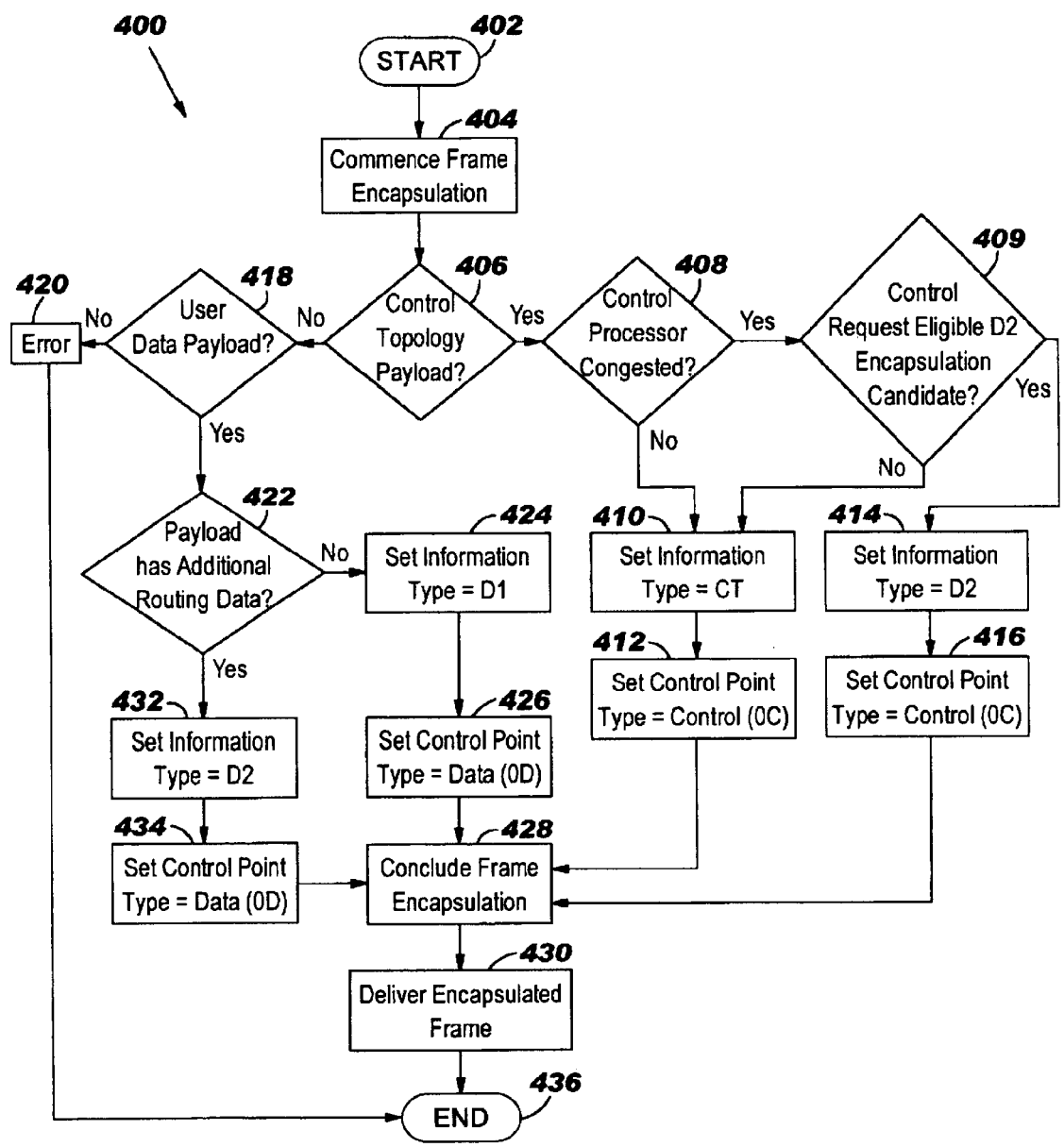
FIG. 4 is a flow chart of an exemplary method executed by a general processor for processing network communication in which the general processor sends the communication to a network processor.

Referring to FIG. 4, a flow chart of an exemplary method 400 executed by general processor 102 for processing network communication within a communication network is shown. Method 400 may be implemented as a software program executable by a hardware system or may be implemented by appropriate devices or components hardwired into the hardware system. Method 400 starts at block 402 and proceeds to block 404, which shows that frame encapsulation of informational frame 334 has commenced. Method 400 next moves to decision block 406, which depicts a determination made by general processor 102 to determine whether the payload in informational frame 334 is control or topology payload. If the payload is control/topology payload, then method 400 proceeds to decision block 408.

At decision block 408, general processor 102 determines whether control processor 108 in network processor 104A is congested or overloaded with requests to process various frames or packets. Such a determination is made through conventional interprocessor communication between general processor 102 and the processors within network processor 104A or can be a fixed assumption that the control processor 108 is always overloaded. For example, general processor 102 can query the task scheduler in the operating system of control processor 108 to determine whether control processor 108 is congested. If control processor is not congested or overloaded with such requests, then method 400 proceeds from decision block 408 to block 410, which shows that general processor 102 sets informational type field 310 with a "CT" setting, and next to block 412, which shows that general processor 102 sets control-point type field 314 with a control setting (i.e., "0C" value). General processor 102 then concludes the encapsulation of informational frame 334 into encapsulated packet 300 at block 428, and, at block 430, general processor 102 delivers encapsulated packet 300, which is a control-type packet, to control processor 108. Control processor 108 processes control or routing information in encapsulated packet 300, which is a control-type packet. Method 400 ends at block 436.

However, if, at decision block 408, control processor 108 is congested or overloaded with requests for processing frames or packets, then method 400 proceeds from decision block 408 to block 409, which determines if the control request is a eligible candidate to be sent using D2 encapsulation. If at decision block 409 the control request is eligible for D2 encapsulation, then method 400 proceeds from decision block 409 to block 414, which shows that general processor 102 sets informational type field 310 with a "D2" setting, and then to block 416, which depicts that general processor 102 sets control-point type field 314 with a control setting (i.e., "0C" value). General processor 102 then concludes the encapsulation of informational frame 334 into encapsulated packet 300 at block 428, and, at block 430, general processor 102 delivers encapsulated packet 300, which is a data-type packet, to data processor 106. Data processor 106 processes the control or routing information in encapsulated packet 300, which is a control-type packet. Method 400 then ends at block 436.

However, if, at decision block 409, the control request is not an eligible D2 encapsulation candidate then method 400 proceeds from decision block 409 to block 410, which shows that general processor 102 sets informational type field 310 with a "CT" setting, and next to block 412, which shows that general processor 102 sets control-point type field 314 with a control setting (i.e., "0C" value). General processor 102 then concludes the encapsulation of informational frame 334 into encapsulated packet 300 at block 428, and, at block 430, general processor 102 delivers encapsulated packet 300, which is a control-type packet, to control processor 108. Control processor 108 processes control or routing information in encapsulated packet 300, which is a control-type packet. Method 400 ends at block 436.

Referring again to decision block 406, if the payload within informational frame 334 of encapsulated packet 300 is not control/topology payload, then method 400 moves from decision block 406 to decision block 418. Decision block 418 represents general processor 102 determining whether the payload is user data payload. If the payload is determined not to be user data payload at decision block 418, then method 400 proceeds to block 420, which shows that general processor 102 generates an error regarding the type of payload in informational frame 334, and method 400 ends at block 436. However, if, at decision block 418, the payload is determined to be user data payload, then method 400 next moves to decision block 422.

Decision block 422 shows general processor 102 determining whether the payload has additional routing information as well as user data. If, at decision block 422, the payload does not have additional routing information, then method 400 proceeds from decision block 422 to block 424, which shows informational type field set with a "D1" setting by general processor 102, and to block 426, which shows control-type point type field 314 set with a data setting (i.e., "0D" value) by general processor 102. Method 400 then moves to block 428, which depicts general processor 102 concluding the encapsulation of informational frame 334 into encapsulated packet 300. Method 400 next proceeds to block 430, which shows that general processor 102 delivers encapsulated packet 300 to data processor 106. Data processor 106 processes the data in encapsulated packet 300 as a data frame. Method then ends at block 436.

However, if, at decision block 422, the payload does have additional routing information, then method 400 proceeds from decision block 422 to block 432, which shows informational type field set with a "D2" setting by general processor 102, and to block 434, which shows control-type point type field 314 set with a data setting (i.e., "0D" value) by general processor 102. Method 400 next moves to block 428, which depicts general processor 102 concluding the encapsulation of informational frame 334 into encapsulated packet 300. Method 400 then proceeds to block 430, which shows that general processor 102 delivers encapsulated packet 300 to data processor 106. Data processor 106 processes the data and additional routing information in encapsulated packet 300 as a data frame. Method then finally ends at block 436.

Figure 5:
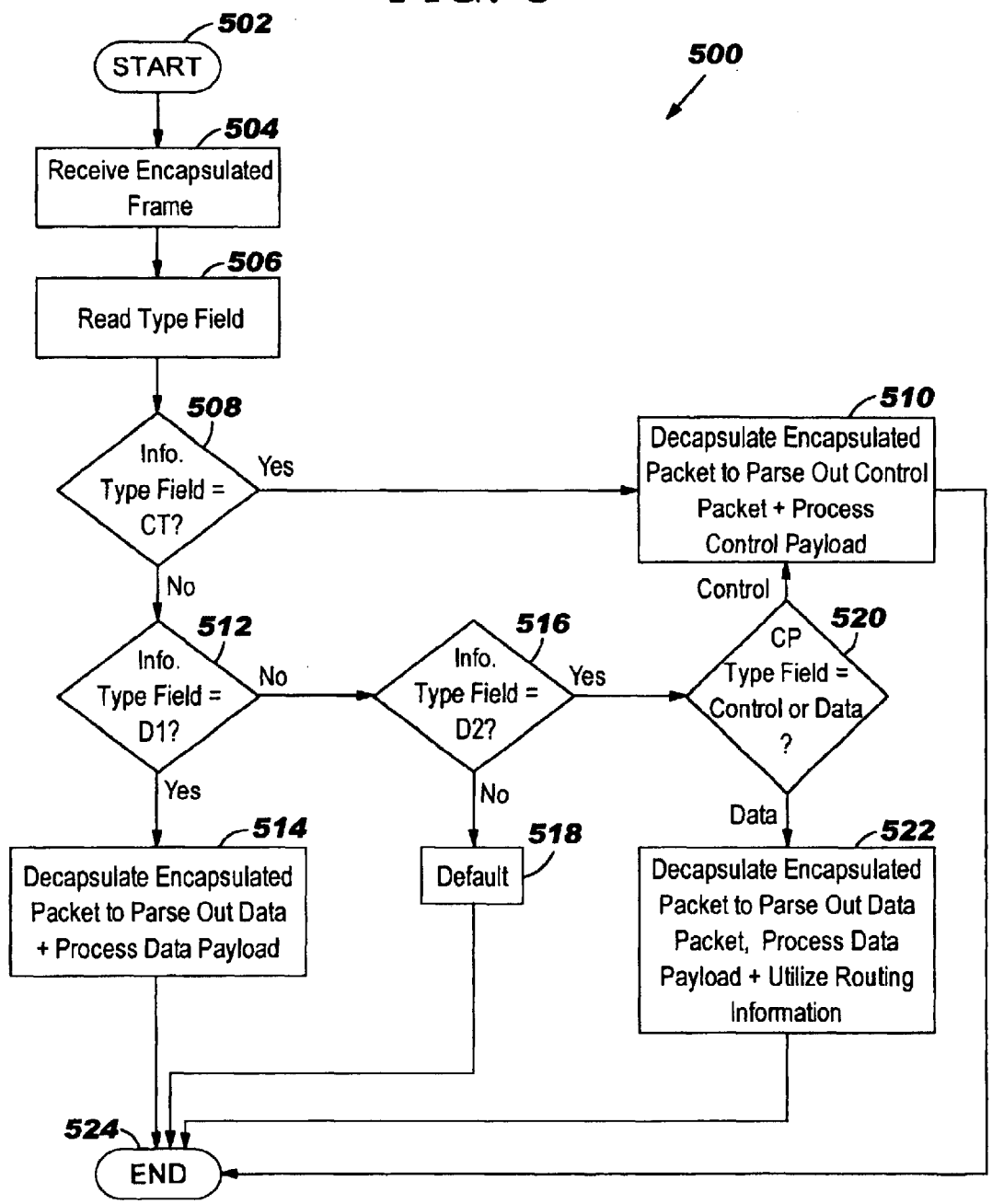
FIG. 5 is a flow chart of an exemplary method executed by a network processor for processing network communication sent by a general processor.

With reference to FIG. 5, a flow chart of an exemplary method 500 executed by network processor 104A for processing network communication received from general processor 102 is shown. Method 500 may be implemented as a software program executable in a hardware system or may be implemented by appropriate devices or components hardwired into the hardware system. Method 500 starts at block 502 and proceeds to block 504, which shows that network processor 104A receives encapsulated packet 300 from general processor 102. Method 500 next moves to block 506, which shows network processor 104A reading informational type field 310 within encapsulated packet 300.

Method 500 proceeds to decision block 508, which depicts network processor 104A determining whether informational type field 310 is set with a "CT" value. If informational type field 310 is set with a "CT" value, then method 500 moves to block 510, which depicts control processor 108 within network processor 104A decapsulating encapsulated packet 300 to parse the control packet (i.e., control or routing information) and process the control or routing payload. Method 500 then ends at block 524.

However, if, at decision block 508, informational type field is not set with a "CT" value, then method 500 proceeds from decision block 508 to decision block 512. At decision block 512, network processor 104A determines whether informational type field 310 is set with a D"1" value. If, at decision block 512, informational type field 310 is set with a "D1" value, then method 500 moves to block 514, which depicts data processor 106 within network processor 104A decapsulating encapsulated packet 300 to parse the data packet and process the data payload. Method 500 then ends at block 524. On the other hand, if, at decision block 512, informational type field 310 is not set with a "D1" value, then method 500 moves to decision block 516, which depicts network processor 104A determining whether informational type field 310 is set with a "D2" value.

If, at decision block 516, informational type field 310 is not set with a "D2" value, then method 500 proceeds from decision block 516 to block 518, which shows network processor 104A generating a default regarding the type of information contained within encapsulated packet 300. Method 500 then ends at block 524. On the other hand, if, at decision block 516, informational type field 310 is set with a "D2" value, then method 500 moves from decision block 516 to decision block 520. At decision block 520, network processor 104A reads and determines whether control-point type field 314 contains a control setting or a data setting. If control-point type field 314 is set with a control setting and informational type field 310 is set with a "D2" value, then method 500 moves from decision block 520 to block 510. At block 510, data processor 106 within network processor 104A decapsulates encapsulated packet 300 to parse the control packet and process the control payload. Method 500 then ends at block 524. On the other hand, if control-type field 314 is set with a data setting and informational type field 310 is set with a "D2" value, then method 500 moves from decision block 520 to block 522. At block 522, data processor 106 within network processor 104A decapsulates encapsulated packet 300 to parse the data packet and process the data payload and utilize the additional routing information. Method then ends at block 524.

While the invention has been particularly shown and described with reference to a preferred embodiment, it will be understood by those skilled in the art that various changes in form and detail may be made therein without departing from the spirit and scope of the invention. For example, although aspects of the present invention have been described with respect to a computer system executing software that directs the functions of the present invention, it should be understood that present invention may alternatively be implemented as a program product for use with a data processing system. Programs defining the functions of the present invention can be delivered to a data processing system via a variety of signal-bearing media, which include, without limitation, non-rewritable storage media (e.g., CD-ROM), rewritable storage media (e.g., a floppy diskette or hard disk drive), and communication media, such as digital and analog networks. It should be understood, therefore, that such signal-bearing media, when carrying or encoding computer readable instructions that direct the functions of the present invention, represent alternative embodiments of the present invention.

What is claimed is:

1. A method in a communication network for processing communication from a general processor to a network processor, said method comprising:
   encapsulating, in said general processor, an informational frame into an encapsulated packet for transmission from the general processor to the network processor having a data processor to process data frames and a control processor to process control frames;
   determining in said general processor information frame type and congestion status of said control processor; and
   in response to the informational frame being a control frame and the control processor being congested, said general processor designating the encapsulated packet as a data-type packet for processing by the data processor.

2. The method according to claim 1, further comprising:
   sending the encapsulated packet from the general processor to the network processor.

3. The method according to claim 2, further comprising:
   decapsulating, by the data processor, the encapsulated packet and parsing the control frame; and
   processing, by the data processor, the control frame.

4. The method according to claim 3, wherein processing, by the data processor, the control frame further comprises:
   directing and executing, by the data processor, a control command defined within the control frame to a target control processor of a target network processor designated within the encapsulated packet.

5. The method according to claim 1, further comprising:
   in response to the informational frame being a control frame and the control processor being available for processing the control frame, designating the encapsulated packet as a control-type packet for processing by the control processor;
   in response to the informational frame being a data frame, designating the encapsulated packet as a data-type packet for processing by the data processor; and
   in response to the informational frame being a data and control frame, designating the encapsulated packet as a data-type packet for processing by the data processor.

6. The method according to claim 1, wherein the encapsulated packet further comprises a destination address field, a source address field, an informational type field, a control-point type field, a target processor field, and the informational frame.

7. A method within a communication network for processing communication from a general processor to a network processor, said method comprising:
   receiving and decapsulating, by a network processor having a data processor to process data frame and a control processor to process control frame, an encapsulated packet into an informational frame;
   monitoring received packets to detect designation and frame type:
   in response to the encapsulated packet being designated as a data-type packet and the informational frame being a control frame, processing the control frame by the data processor.

8. The method according to claim 7, wherein receiving and decapsulating an encapsulated packet further comprising:
   parsing, by the data processor, the control frame from the encapsulated packet.

9. The method according to claim 7, wherein processing the control frame by the data processor further comprises:
directing and executing, by the data processor, a control command defined within the control frame to a target control processor of a target network processor designated within the encapsulated packet.

10. The method according to claim 7, further comprising:
in response to the encapsulated packet being designated a control-type packet and the informational frame being the control frame, processing the control frame by the control processor;
in response to the encapsulated packet being designated a data-type packet and the informational frame being a data frame, processing the data frame by the data processor; and
in response to the encapsulated packet being designated a data-type packet and the informational frame being a data and control frame, processing the data and control frame by the data processor.

11. A system for processing network communication, comprising:
a general processor that encapsulates an informational frame into an encapsulated packet for transmission within a communication network from the general processor to a network processor having a data processor that processes data frames and a control processor that processes control frames wherein said general processor responsive to the informational frame being a control frame and the control processor being congested designates the encapsulated packet as a data-type packet for processing by the data processor.

12. The system according to claim 11, further comprising:
a network processor coupled to the general processor wherein the network processor comprises a data processor and a control processor; and
wherein the general processor sends the encapsulated packet to the network processor.

13. The system according to claim 12, wherein:
the network processor further comprises at least one frame processing unit that receives and decapsulates from the general processor the encapsulated packet and that parses the control frame from the encapsulated packet; and
the data processor processes the control frame.

14. The system according to claim 13, wherein the data processor directs and executes a control command defined within the control frame to a target control processor of a target network processor designated within the encapsulated packet.

15. The system according to claim 11, wherein the general processor further comprises at least one frame processing unit that encapsulates the informational frame into the encapsulated packet and sends the encapsulated packet from the general processor to the network processor.

16. A network processor, comprising:
a data processor that processes data frames; and
a control processor that processes control frames, wherein the network processor receives and decapsulates an encapsulated packet, that has been transmitted within a communication network from a general processor, into an informational frame and wherein the data processor, responsive to the encapsulated packet being designated as a data-type packet and the informational frame being a control frame, processes the control frame.

17. The network processor according to claim 16, wherein the data processor parses the control frame from the encapsulated packet.

18. The network processor according to claim 16, wherein the data processor directs and executes a control command defined within the control frame to a target control processor of a target network processor designated within the encapsulated packet.

19. The network processor according to claim 16, further comprising:
at least one frame processing unit that receives and decapsulates from the general processor the encapsulated packet and that parses the control frame from the encapsulated packet.

20. A program product for processing network communication from a general processor to a network processor, said program product comprising:
a control program that instructs a general processor to encapsulate an informational frame into an encapsulated packet for transmission within a communication network from the general processor to a network processor having a data processor and a control processor and to designate a packet type for the encapsulated packet, wherein responsive to the informational frame being a control frame and the control processor being congested for processing the control frame, said control program instructs the general processor to designate the encapsulated packet as a data-type packet for processing by the data processor; and
computer usable media bearing said control program.

21. The program product according to claim 20, further comprising:
said control program instructs the general processor to send the encapsulated packet to the network processor.

22. The program product according to claim 21, wherein the program product further has another control program:
said another control program instructs the data processor to decapsulate the encapsulated packet and parse the control frame from the encapsulated packet; and
said another control program instructs the data processor to process the control frame.

23. The program product according to claim 22, wherein:
said another control program instructs the data processor to direct and execute a control command defined within the control frame to a target control processor of a target network processor designated within the encapsulated packet.

24. A program product for processing network communication from a general processor to a network processor, said program product comprising:
a control program that instructs a network processor having a data processor and a control processor to receive and decapsulate an encapsulated packet, that has been transmitted within a communication network from a general processor, into an informational frame, wherein responsive to the encapsulated packet being designated as a data-type packet and the informational frame being a control frame, said control program instructs the data processor to process the control frame; and
computer usable media bearing said control program.

25. The program product according to claim 24, wherein said control program instructs the data processor to parse the control frame from the encapsulated packet.

26. The program product according to claim 24, wherein:
said control program instructs the data processor to direct and execute a control command defined within the control frame to a target control processor of a target network processor designated within the encapsulated packet.

27. A data structure for network communication within a communication network including a general processor and a network processor having a data processor and a control processor, said data structure comprising:

an encapsulated packet which includes at least a destination address field, a source address field, an informational type field, a control-point type field, a target processor field, and an informational frame, wherein the encapsulated packet is transmitted from the general processor to the network processor, and wherein the informational type field indicates a data-type setting if the encapsulated packet is a data-type packet and the control-point type field indicates a control-type setting to designate the informational frame for processing by the data processor.

28. A system to process network communication comprising:

a general processor;

at least one network processor operatively coupled to the general processor, said at least one network processor including a data processor to process data frames and a control processor to process control frame, wherein said general processor upon determining a frame to be transmitted is a control frame and the control processor is congested encapsulate the frame as a data packet that is forwarded to the data processor for processing.

29. A program product comprising:

a medium on which a computer program is recorded, said computer program including a first set of instructions monitoring to detect congestion status of a control processor which processes a first type of information in a network processor; and a second set of instructions which encapsulates control informational frames as data packets which are forwarded to data processor in said network processor for processing only if the control processor is congested.

30. The program product of claim 29 further including third set of instructions that encapsulate the control informational frame as a control packet that is forwarded to the control processor only if said control processor is not congested.

* * * * *